UNITED STATES PATENT OFFICE.

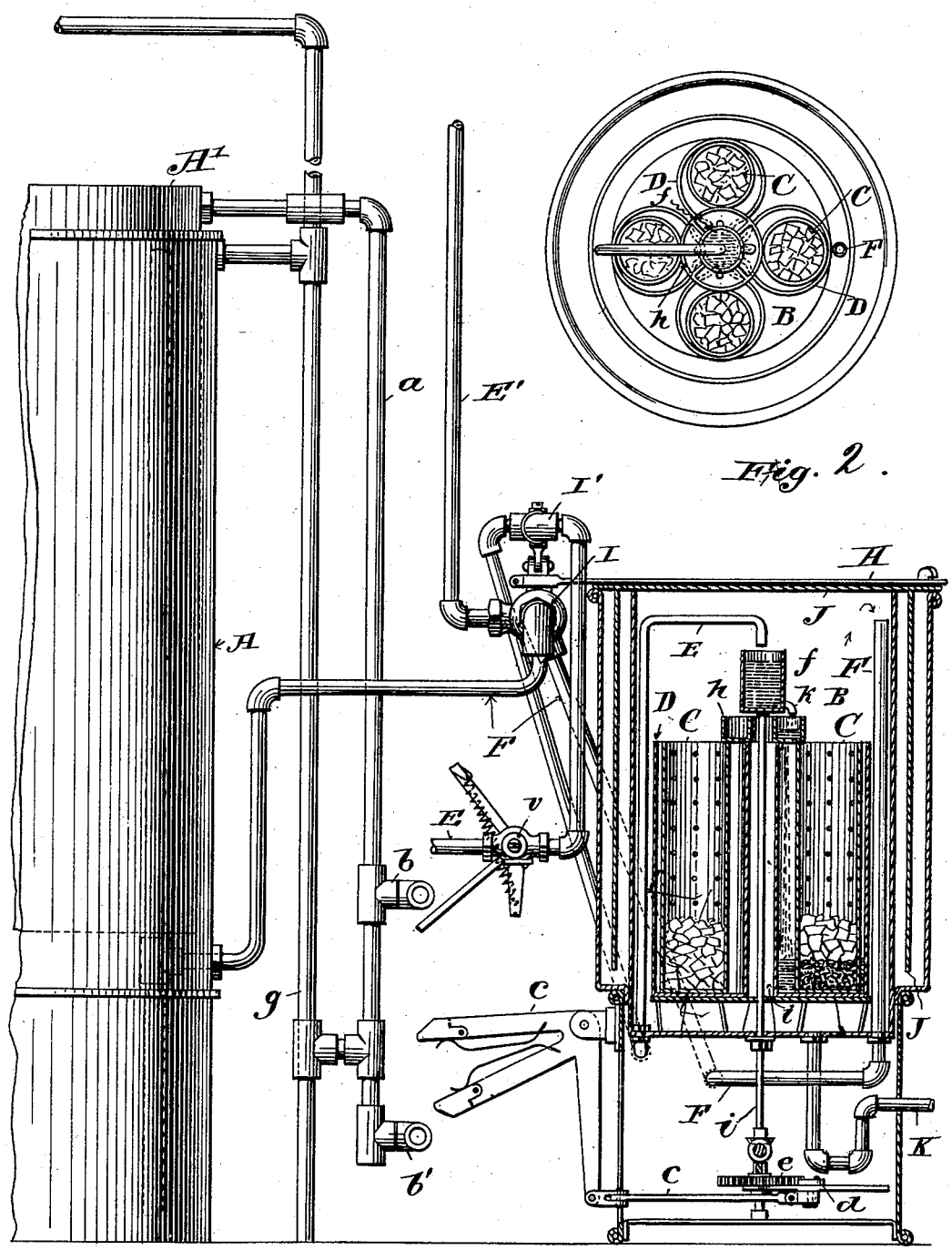

MELVIN D. COMPTON, OF EAST ORANGE, NEW JERSEY.

ACETYLENE-GAS GENERATOR.

SPECIFICATION forming part of Letters Patent No. 679,726, dated August 6, 1901.

Application filed January 10, 1901. Serial No. 42,706. (No model.)

*To all whom it may concern:*

Be it known that I, MELVIN D. COMPTON, a citizen of the United States, and a resident of East Orange, in the county of Essex and State of New Jersey, have invented certain new and useful Improvements in Gas-Generators, of which the following is a specification.

My invention relates to gas-generators of the class employed in the generation of acetylene. It relates especially to that kind of generators in which the carbid is contained in a series of removable carbid-receptacles that are each in turn automatically supplied with the decomposing liquid.

In the drawings, Figure 1 is a view in elevation of the gasometer and generator with their connections, the generator being shown in vertical section. Fig. 2 is a top view of the generator with the cover removed.

In the drawings, A is the gasometer; B, the generator; C, the removable carbid-receptacles contained in the vertical cylinders D.

E is the water-supply pipe; F, the gas-pipe leading from the generator to the gasometer.

H is a swinging lever which serves both to hold down the cover J of the generator B and to control the water-supply valve I' and the three-way valve I, which regulates the gas-delivery F and the vent-pipe E'.

K is the generator drain-pipe.

$g$ is a rod fastened to the side of the gasometer A, serving as a guide for the rod $a$, attached to the top of the gasometer-bell A'. This rod $a$ carries at predetermined points two projections $b\ b'$, the former of which operates to open at the proper time the water-supply pipe E, and the latter through the rock-lever $c$, the pawl $d$, and the ratchet-wheel $e$ controls the revolution of the vessel $f$, (furnished with a spout,) which delivers the liquid to the cylinders containing the removable carbid-receptacles. $b'$ in its ascent shuts off the water-supply pipe. The containing-cylinders D are not entirely circular, but have an offset at one side, as shown in Fig. 2, in order to let the liquid come from the bottom of the cylinder into contact with the carbid in receptacles C. On the top of the cylinders D is a dish $h$, divided into as many vertical compartments as there are cylinders D. In the bottom of the dish $h$ is a hole perforated in each compartment, and these holes register with the offsets on the cylinder D. Revolubly mounted above the dish $h$, carried by the rod $i$, is the vessel $f$, provided with the water-spout $k$. It has been found that when the water is delivered on the top of the carbid it very soon reduces the upper portion of the same to a pasty condition, preventing a free escape of the gas. For this reason I deliver the water at the bottom of the carbid mass.

I have purposely made the vessel $f$ small and light and the mechanism connected with the revolution thereof light and easy moving, since if the revoluble parts were heavy, as in existing machines, when the gas got low and had little pressure if the gasometer were obliged in its descent to operate heavy acting machinery the pressure would be still further reduced and the requirements of the fire-underwriters in that respect violated. Hence my endeavor at easy-working devices.

The operation is as follows: Assuming the carbid-receptacles to have been charged and put in place, the cover J of the generator is put in position and the locking-lever H is swung around and caught. The operation of swinging around the lever H works the two-way water-valve I', opening the water-pipe E, at the same time opening a passage for the gas through the pipe F and closing the vent-pipe E' by means of the three-way valve I. When the water reaches the carbid, flowing first into the vessel $f$, thence through the spout $k$ to the vertical divided dish $h$, gas begins to be generated and passes by the pipe F to the gasometer A. The bell A' begins to rise, carrying with it the rod $a$, provided with the projections $b$ and $b'$. $b$ in its descent has let on the water by means of the spring-controlled valve $v$. As A' ascends, carrying with it the projection $b'$, this projection $b'$ contacts with the upper arm of rock-lever $c$ and brings the pawl $d$ into position to engage the toothed wheel $e$ and move it when projection $b'$ descends, when it operates pawl $d$ and ratchet $e$ to revolve rod $i$ and with it the spouted vessel $f$, bringing the spout $k$ over a new compartment of the divided dish $h$, which new compartment is over a fresh carbid-receptacle cylinder. Meanwhile in its ascent the projection $b'$ has operated to close the valve $v$, shutting off the liquid from the pipe E.

Gas continues to generate until bell A' descends, when the cycle of operations is repeated.

An advantage of my method of revolving the vessel $f$ over that of revolving the water-supply pipe is that in the latter arrangement the swivel-joints which must carry the water become clogged with sediment or stick from other causes, thereby impairing the working of the apparatus. My dish $h$ always remaining in the same place, with its orifice registering with the cylinder offset, the water is always delivered into the proper compartment and not between two or into two adjacent carbid-receptacles at the same time.

Having thus fully explained and illustrated my invention, what I claim is—

In acetylene-gas generators, the combination of a series of vertical removable carbid-compartments, separate containing-cylinders therefor having an offset at one side, a removable liquid-distributing dish provided with separate compartments, each provided with a delivery-orifice registering with one of said offsets, and a rotary mounted liquid-supply vessel, said rotary movement being operated automatically by the gas-supply, substantially as set forth.

Signed at New York, in the county of New York and State of New York, this 8th day of January, A. D. 1901.

MELVIN D. COMPTON.

Witnesses:
D. N. HURLBUT,
A. STETSON.